United States Patent
Henry et al.

(10) Patent No.: US 12,445,659 B2
(45) Date of Patent: Oct. 14, 2025

(54) ELECTRONIC METHOD AND DEVICE FOR DECODING A DATA STREAM, AND ASSOCIATED COMPUTER PROGRAM

(71) Applicant: ORANGE, Issy-les-Moulineaux (FR)

(72) Inventors: Félix Henry, Saint-Grégoire (FR); Gordon Clare, Pacé (FR)

(73) Assignee: ORANGE, Issy-les-Moulineaux (FR)

( * ) Notice: Subject to any disclaimer, the term of this patent is extended or adjusted under 35 U.S.C. 154(b) by 77 days.

(21) Appl. No.: 18/248,023

(22) PCT Filed: Oct. 1, 2021

(86) PCT No.: PCT/EP2021/077157
§ 371 (c)(1),
(2) Date: Apr. 5, 2023

(87) PCT Pub. No.: WO2022/073885
PCT Pub. Date: Apr. 14, 2022

(65) Prior Publication Data
US 2023/0379506 A1  Nov. 23, 2023

(30) Foreign Application Priority Data
Oct. 6, 2020 (FR) .................... 2010214

(51) Int. Cl.
*H04N 19/91* (2014.01)
*H04N 19/436* (2014.01)

(52) U.S. Cl.
CPC .......... *H04N 19/91* (2014.11); *H04N 19/436* (2014.11)

(58) Field of Classification Search
CPC ...... H04N 19/91; H04N 19/436; H04N 19/70; G06T 9/002; G06T 2207/20084
See application file for complete search history.

(56) References Cited

U.S. PATENT DOCUMENTS 10,963,782 B2 * 3/2021 Xiong ............... G06N 3/045
11,095,894 B2 * 8/2021 Jeon ................. G06N 99/00
(Continued)

FOREIGN PATENT DOCUMENTS

| CN | 110728726 A | * 1/2020 | ............ G06N 3/08 |
| CN | 113658130 A | * 11/2021 | ............ G06N 3/047 |

(Continued)

OTHER PUBLICATIONS

Gary J. Sullivan et al., "Overview of the High Efficiency Video Coding (HEVC)N Standard", IEEE Transactions on Circuit and Systems for Video Technology, vol. 22, No. 12, Dec. 2012, pp. 1649-1668. (Year: 2012).*

(Continued)

*Primary Examiner* — Dramos Kalapodas
(74) *Attorney, Agent, or Firm* — David D. Brush; Westman, Champlin & Koehler, P.A.

(57) ABSTRACT

A method for decoding a bit sequence includes applying, at the input of an artificial neural network, previously decoded values; as a result of the previously decoded values being applied, producing a context index at the output of the artificial neural network; and obtaining a new decoded value by applying a portion of the bit sequence to an entropic decoder parameterized in the context identified by the produced context index. An electronic decoding device and an associated computer program are also provided.

16 Claims, 3 Drawing Sheets

(56) References Cited

U.S. PATENT DOCUMENTS

| | | | |
|---|---|---|---|
| 11,250,595 B2* | 2/2022 | Covell | G06N 3/045 |
| 2022/0004844 A1* | 1/2022 | Haase | G06N 3/04 |

FOREIGN PATENT DOCUMENTS

| | | |
|---|---|---|
| EP | 3 624 452 | 3/2020 |
| WO | 2018/218249 | 11/2018 |
| WO | 2022/013247 | 1/2022 |
| WO | 2022/013249 | 1/2022 |
| WO | 2022/069437 | 4/2022 |

OTHER PUBLICATIONS

Simon Wiedemann et al., "DeepCABAC: Context-adaptive binary arithmetic coding for deep neural network compression", Proceedings of the 36th International Conference on Machine Learning, Long Beach, California, 2019, 4 pp. (Year: 2019).*

Jian-Kang Wu "Content-Based Indexing of Multimedia Databases", Transactions on Image Processing, vol. 9, No. 6, Nov./Dec. 1997: 1041-4347 (c) 1997 IEEE (Year: 1997).*

International Search Report dated Feb. 4, 2022, for PCT/EP2021/077157, 7 pp.

Written Opinion of the ISA dated Feb. 4, 2022, for PCT/EP2021/077157, 7 pp.

Detlev Marpe et al., "Content-Based Adaptive Binary Arithmetic Coding in the H.264/AVC Video Compression Standard", IEEE Transactions on Circuit and Systems for Video Technology, vol. 13, No. 7, Jul. 2003, 18 pp.

Gary J. Sullivan et al., "Overview of the High Efficiency Video Coding (HEVC)N Standard", IEEE Transactions on Circuit and Systems for Video Technology, vol. 22, No. 12, Dec. 2012, pp. 1649-1668.

Guo Lu et al., "DVC: An End-to-end Deep Video Compression Framework", Computer Vision Foundation (CVF), 2019, pp. 11006-11015.

Anonymous, International Telecommunication Union, ITU-T, H.265, Telecommunication Standardization Sector of ITU, Series H: Audio-visual and Multimedia Systems, Infrastructure of audiovisual services—Coding of moving video, High efficiency video coding, Recommendation ITU-T H.265, Nov. 2019, 712 pp.

Simon Wiedemann et al., "DeepCABAC: Context-adaptive binary arithmetic coding for deep neural network compression", Proceedings of the 36$^{th}$ International Conference on Machine Learning, Long Beach, California, 2019, 4 pp.

Simon Wiedemann et al., "Compact and Computationally Efficient Representation of Deep Neural Networks", IEEE Transactions on Neural Networks and Learning Systems, vol. 31, No. 3, Mar. 2020, pp. 772-785.

English translation of the Written Opinion of the International Searching Authority dated Feb. 4, 2022 for corresponding International Application No. PCT/EP2021/077157, filed Oct. 1, 2021.

* cited by examiner

ELECTRONIC METHOD AND DEVICE FOR DECODING A DATA STREAM, AND ASSOCIATED COMPUTER PROGRAM

CROSS-REFERENCE TO RELATED APPLICATIONS

This application is the U.S. national phase of International Application No. PCT/EP2021/077157 filed Oct. 1, 2021, which designated the U.S. and claims priority to FR 2010214 filed Oct. 6, 2020, the entire contents of each of which are hereby incorporated by reference.

TECHNICAL FIELD OF THE INVENTION

The present invention relates to the technical field of data decoding.

In particularly, it relates to a method and an electronic device for decoding a data stream, as well as an associated computer program.

STATE OF THE ART

Entropy encoding is used, in particular in the field of audio or video content encoding, to optimally compress data taking into account the statistics of appearance of the different symbols in these data.

Within this framework, mention can be made for example of CABAC ("Context-based adaptive binary arithmetic coding") as described in the article "*Context-based adaptive binary arithmetic coding in the H.264/AVC video compression standard*", by D. Marpe, H. Schwarz, and T. Wiegand, in IEEE Transactions on Circuits and Systems for Video Technology, vol. 13, no. 7, pp. 620-636, July 2003.

During the decoding, the entropy decoder is, at all times, configured in a context that depends, in a manner predefined in the relevant standard, on the previously decoded syntax elements.

DISCLOSURE OF THE INVENTION

The present invention proposes a method for decoding a sequence of binary elements, the method comprising the following steps:
 applying, at the input of an artificial neural network, previously decoded values;
 as a result of said application, producing a context index at the output of the artificial neural network;
 obtaining a new decoded value by applying part of the sequence of binary elements to an entropy decoder parameterized in the context identified by the produced context index.

Producing the context identifier by means of an artificial neural network provides greater flexibility in the use of entropy encoding, which is interesting in particular when the format of the data is not totally predefined.

As explained hereinafter, the decoding method may then comprise, at each of a plurality of iterations (comprising a current iteration and a preceding iteration), obtaining decoded values by entropy decoding (by means of the above-mentioned entropy decoder), and the method defined hereinabove for decoding the sequence of binary elements can then comprise the following steps:
 applying, to the input of an artificial neural network, the decoded values obtained by entropy decoding at the preceding iteration;
 as a result of said application, producing a context index at the output of the artificial neural network;
 obtaining decoded values at the current iteration by applying part of the sequence of binary elements to the entropy decoder parameterized in the context identified by the produced context index.

The method may further comprise a step of applying the new decoded value to the input of the artificial neural network in such a way as to produce, at the output of the artificial neural network, data representative of an audio or video content. In this case, the artificial neural network thus produces, on the one hand, the context index and, on the other hand, the data representative of the audio or video content.

It may be provided for example that a first part of the artificial neural network produces the context index (this first part thus being called "context determination artificial neural network" in the following description) and a second part of the artificial neural network produces the data representative of the audio or video content (this second part thus being called "decoding artificial neural network" in the following description).

Moreover, it may be provided that a process of entropy decoding by the entropy decoder is suspended as long as a new context index is not produced at the output of the artificial neural network. This allows synchronization between artificial neural network and entropy decoder.

The sequence of binary elements may be included in a data stream. The data stream may then also include a piece of information indicative of a set of contexts usable within the entropy decoder. Such piece of information is for example indicative of a number of contexts usable within the entropy decoder.

The method may further comprise a step of initializing each context usable within the entropy decoder, for example by means of a parameterization piece of data included in the data stream including the sequence of binary elements.

As this is the case in the embodiments described below, the artificial neural network may be implemented by a processing unit.

The method may then comprise a step of configuring the processing unit as a function of data included in the data stream including the sequence of binary elements.

It is also possible, for example during this configuration step, to apply predefined values at the input of the artificial neural network in such a way as to produce (at the output of the artificial neural network) an initial context index (even before the entropy decoder has started decoding the sequence of binary elements). The entropy decoder is thus parameterized in the context indicated by this initial context index for entropy decoding the first elements of the sequence of binary elements (in such a way as to obtain first decoded values to apply to the input of the artificial neural network to initiate the above-described process).

According to another possibility, the entropy decoder may be parameterized in a predefined initial context as long as the artificial neural network does not produce a context index. The entropy decoding may thus be performed in this initial context to process the first elements of the sequence of binary elements and to thus obtain first decoded values to be applied at the input of the artificial neural network in such a way that the artificial neural network produces a context index.

The artificial neural network is for example implemented by means of a parallel processing unit designed to perform in parallel, at a given time, a plurality of operations of the same type.

The entropy decoder may be implemented by means of a processor that is distinct from the parallel processing unit.

The invention also proposes a computer program comprising instructions executable by a processor and designed to implement a decoding method as described hereinabove when these instructions are executed by the processor.

The invention finally proposes an electronic device for decoding a sequence of binary element, comprising:
  an artificial neural network designed to receive previously decoded values as an input and to produce a context index as an output;
  an entropy decoder designed to receive the sequence of binary elements as an input;
  a control module designed to parameterize the entropy decoder in the context identified by the produced context index, in such a way as to obtain a new decoded value at the output of the entropy decoder.

As explained hereinafter, the previously decoded values are for example decoded by entropy decoding in an iteration that precedes the iteration during which the new decoded value is obtained (i.e. produced by the entropy decoder).

This electronic decoding device may comprise a synchronization mechanism able to suspend an entropy decoding process by the entropy decoder as long as a new context index is not produced at the output of the artificial neural network.

This electronic decoding device may also comprise a processing unit able to implement the artificial neural network.

The control module may then be designed to configure the processing unit as a function of data included in the data stream including the sequence of binary elements, in such a way that the processing unit can implement the artificial neural network as indicated hereinabove.

The electronic decoding device may moreover comprise a processor that is distinct from the processing unit and designed to implement the entropy decoder.

Of course, the different features, alternatives and embodiments of the invention can be associated with each other according to various combinations, insofar as they are not mutually incompatible or exclusive.

DETAILED DESCRIPTION OF THE INVENTION

Moreover, various other features of the invention will be apparent from the appended description made with reference to the drawings that illustrate non-limiting embodiments of the invention, and wherein:

FIG. 1 shows a data processing assembly comprising several parts of artificial neural network;

FIG. 2 schematically illustrates feature maps used within the processing assembly of FIG. 1;

Figure 1:
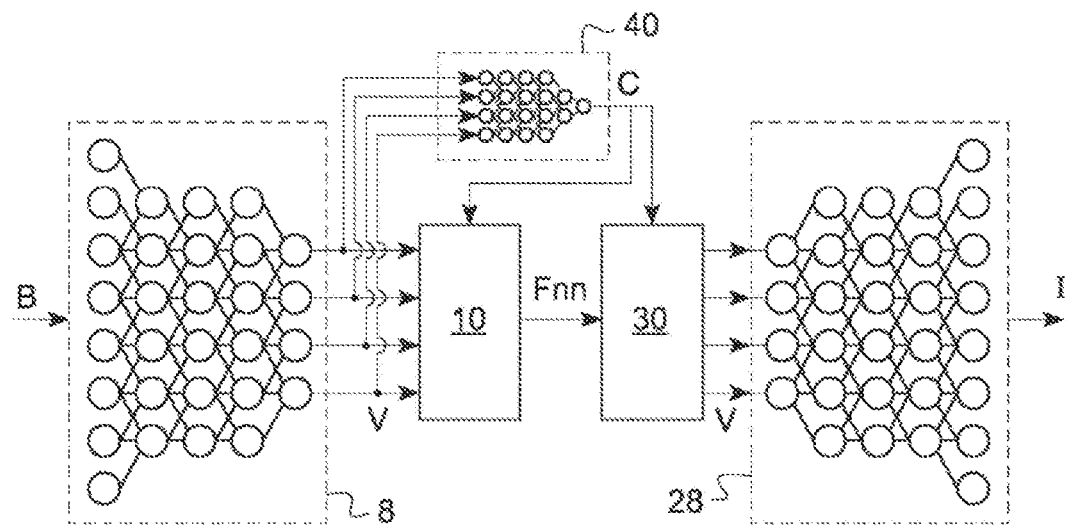
FIG. 1 shows a data processing assembly the different parts of which are used either for encoding an audio or video content, or for decoding encoded data in order to render an audio of video content, as explained hereinafter.

This assembly comprises an encoding artificial neural network 8, an entropy encoder 10, a context determination artificial neural network 40, an entropy decoder 30 and a decoding artificial neural network 28.

Encoding artificial neural network 8 is designed to receive as an input (i.e. on an input layer) content data B forming a representation (here non-compressed) of an audio or video content. For example, in the case of a video content, the content data comprise, for each pixel of each image of a sequence of images, data representing a luminance value of the pixel and data representing chrominance values of the pixel.

Content data B applied at a given time to the input layer of encoding artificial neural network 8 may represent a block of an image, or a block of an image component (for example, a block of a luminance or chrominance component, or a block of a color component of this image), or an image of a video sequence, or a component of an image of a video sequence (for example, a luminance or chrominance component, or a color component), or also a series of images of the video sequence.

It may be provided for example that some at least of the neurons (or nodes) of the input layer of encoding artificial neural network 8 each receive a pixel value of an image component, said value being represented by one piece of the content data B.

When these content data B are applied to the input (i.e. to the input layer) of encoding artificial neural network 8, encoding artificial neural network 8 produces as an output values V, themselves representative of the audio or video content.

Representative values V produced at the output of encoding artificial neural network 8 however form a more compact representation than the corresponding content data B applied to the input of encoding artificial neural network 8. For example, the number of nodes of the output layer of encoding artificial neural network 8 is lower (for example, 4 times lower, or even 8 times or 16 times lower) than the number of nodes of the input layer of encoding artificial neural network 8.

Figure 2:
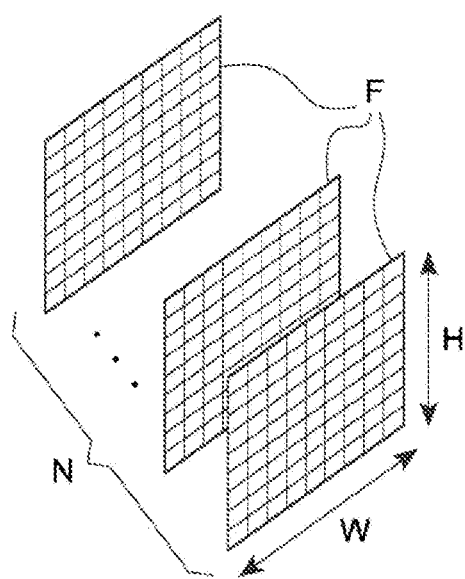

Representative values V produced at the output of artificial neural network 8 are here organized into a sequence of feature maps F, as schematically shown in FIG. 2. Encoding artificial neural network 8 here produces for example N feature maps F.

Each feature map F has for example a two-dimensional structure (or matrix structure). Thus, each feature map F here forms a matrix of H lines and W columns.

An element located at a given position in a given feature map F corresponds to representative value V produced by an output node (or node of the output layer) of encoding artificial neural network 8, this output node being associated in a predefined manner with this given position and with this given feature map F. According to a possible embodiment, artificial neural network 8 produces as an output (i.e. on its output layer), at a given time, all the N feature maps. According to another possible embodiment, different sets of content data B (corresponding for example to different positions in the image) are applied at different times to the input (i.e. to the input layer) of artificial neural network 8, and artificial neural network 8 produces at each of these different times, as an output (i.e. on its output layer), a corresponding feature map F (the output nodes of artificial neural network 8 being in this case respectively associated with the different positions of a single feature map F).

As an alternative, the representative values V produced at the output of the encoding artificial neural network 8 may be organized into an ordered sequence of representative values V. When content data B applied to the input of encoding artificial neural network 8 represent a block of an image (or a block of an image component), the ordered sequence of representative values V produced at the output of encoding artificial neural network 8 is associated with this block. The different sequences of representative values successively produced by artificial neural network 8 are thus respectively associated with the different blocks of the image (or with the different blocks of the relevant component of the image).

According to still another alternative, representative values V produced at the output of encoding artificial neural network 8 are placed within a multi-dimensional (for example, M-dimensional) structure of data. Each element of this structure is then identified by its position within the structure, i.e. in the above-mentioned example, by means of an M-tuple of coordinates. A representative value V produced by a given output node (i.e. by a given node of the output layer) of encoding artificial neural network 8 then forms an element of the structure identified by a position within the structure associated in a predefined manner with this output node (i.e. by coordinates associated in a predefined manner with this output node).

Representative values V produced at the output (i.e. on the output layer) of encoding artificial neural network 8 are applied, on the one hand, to the input of entropy encoder 10 and, on the other hand, to the input (i.e. to the input layer) of context determination artificial neural network 40.

Context determination artificial neural network 40 thus receives as an input (i.e. on its input layer) representative values V (corresponding for example to a block of an image being encoded, or to a block of a component of the image being encoded) and consequently produces as an output a context index C. Context index C is here produced on an output node of context determination artificial neural network 40.

In the example described here, context determination artificial neural network 40 contains only this unique output node. However, as an alternative, context determination artificial neural network 40 could produce as an output a plurality of context indices C each respectively associated with at least one representative value V (for example, with a set of representative values V). In the case described hereinabove, the context indices C produced at the output of context determination artificial neural network 40 may be respectively associated with the different feature maps F (each containing a set of representative values V).

As can be seen in FIG. 1, the context index C produced by context determination artificial neural network 40 is applied to entropy encoder 10 and to entropy decoder 30.

Entropy encoder 10 is designed to encode several statistical sources each corresponding to a particular probability of appearance of the symbols to be encoded. For that purpose, entropy encoder 10 may be parameterized in a particular context, associated with a given statistical source and in which entropy encoder 10 produces an optimum entropy encoding if the effectively encoded symbols (here representative values V) meet the expected probability for this statistical source.

Hereinafter, the number of contexts in which entropy encoder 10 can be parameterized during entropy encoding of representative values V (i.e. the number of different statistical sources that can be processed in the signal formed by representative values V) is denoted K. For example, K=160.

Entropy encoder 10 is here of the CABAC ("Context-based adaptive binary arithmetic coding") type. As an alternative, it could be another type of entropy encoder, for example an encoder of the Huffman type, an arithmetic encoder or an LZW ("Lempel-Ziv-Welch") encoder.

Representative values V received at the input of entropy encoder 10 are ordered in a predefined manner for entropy encoding by entropy encoder 10.

For example, in the example described herein, in which the representative values are organized into a sequence of feature maps F, the different feature maps F are processed in the order of this sequence, and within each feature map F, the elements (i.e. representative values V) are taken into account in a predefined (scanning) order.

Entropy encoder 10 performs the entropy encoding of the ordered representative values V received as an input, while being parameterized in the context indicated by the context index C produced at the output of context determination artificial neural network 40. In the alternative embodiment in which a plurality of context indices C are produced at the output of context determination artificial neural network 40, in association with the different feature maps F, respectively, entropy encoder 10 performs entropy encoding of the ordered representative values V received as an input, while being parameterized (at all times) in the context indicated by the context index C associated with the feature map F being entropy encoded.

Entropy encoder 10 then produces as an output a sequence Fnn of binary elements. As will become apparent in the following, this sequence Fnn of binary elements corresponds to the stream of compressed data representing the audio or video content (data stream generated at the output of electronic encoding device 2 described hereinafter with reference to FIG. 3 and intended to the electronic decoding device 20 described hereinafter with reference to FIG. 6).

Sequence Fnn of binary elements is applied to the input of entropy encoder 30, entropy encoder 30 being parameterized in the context indicated by the context index C produced at the output of context determination artificial neural network 40.

Entropy decoder 30 is designed to perform an entropy decoding that is the reverse of the entropy encoding performed by entropy encoder 10 described hereinabove. Entropy decoder 30 is thus here an entropy decoder of the CABAC ("Context-based adaptive binary arithmetic coding") type. As an alternative, it could be another type of entropy encoder, for example a decoder of the Huffman type, an arithmetic decoder or an LZW ("Lempel-Ziv-Welch") decoder.

Entropy decoder 30 thus produces as an output representative values V identical to those applied to the input of entropy encoder 10. (It is recalled in this respect that the entropy encoding is a lossless encoding.)

The representative values V produced at the output of entropy decoder 30 are applied to the input (i.e. to an input layer) of decoding artificial neural network 28.

The respective assignment of the representative values V to the input nodes (or nodes of the input layer) of decoding artificial neural network 28 is predefined. (It is moreover observed that the output layer of encoding artificial neural network 8 corresponds to the input layer of decoding artificial neural network 28. Indeed, the use of entropy encoding allows a better compression of the data, but does not modify these data.)

When decoding artificial neural network 28 receives representative values V as an input, decoding artificial neural network 28 produces as an output (i.e. on an output layer) a representation I of the content adapted to a reproduction on an audio or video reproduction device.

In the case of a video content (comprising an image or a sequence of images), artificial neural network 28 thus produces as an output (i.e. on its output layer) at least one matrix representation I of an image block (or a block of an image component or, as an alternative, an image or an image component).

Hereinabove has been described with reference to FIG. 1 a data processing assembly making it possible to produce, from content data B, a compressed stream (sequence Fnn of binary elements) representing this content and, using this compressed stream, a representation I of this content intended for reproduction on an audio or video reproduction device.

Such a set of data may be optimized, during a learning phase of the different artificial neural networks 8, 28, 40 as described up to now, for a particular type of content and/or a particular rate-distortion compromise.

Firstly, a sequence of audio or video learning contents (for example, here, a series of learning videos) is selected. It is a set of contents representative of the type of content that is desired to be compressed with this data processing assembly.

Each content (here, each video) of the learning sequence may then be applied (as content data B) to the input of encoding artificial neural network 8, which makes it possible to produce each time (as explained hereinabove) a sequence Fnn of binary elements (at the output of entropy encoder 10) and a representation I to be displayed (at the output of decoding artificial neural network 28).

A cost function is used to numerically evaluate the efficiency of the data processing assembly in its current configuration. Such a cost function is for example rate-distortion cost such as $R+\lambda \cdot D$, where D is the distortion (square error) between the content that is rendered (using representation I) and the initial content (represented by content data B), R is the rate (real or estimated) of the compressed stream (i.e. of sequence Fnn of binary elements), and $\lambda$ is a parameter provided by the user, making it possible to chose the compromise between compression and quality.

This cost function is used within a gradient back propagation learning algorithm to vary the weights assigned to the neurons of the artificial neural networks 8, 28, 40 in such a way as to minimize the cost function.

The weights assigned to the neurons of the artificial neural networks 8, 28, 40 when the minimal cost is considered to be reached define these artificial neural networks 8, 28, 40, and thus the data processing assembly, as they will be used in the following.

It is thus possible to define several optimum data processing assemblies of this type (each defined in particular by a set of weights assigned to the neurons of the artificial neural networks 8, 28, 40), respectively for different types of contents (i.e. of learning sequences) and/or different compromises between compression and quality (each compromise corresponding to a specific parameter A).

Now will be described how the parts of such data processing assembly can be used within an electronic encoding device and an electronic decoding device.

Figure 3:
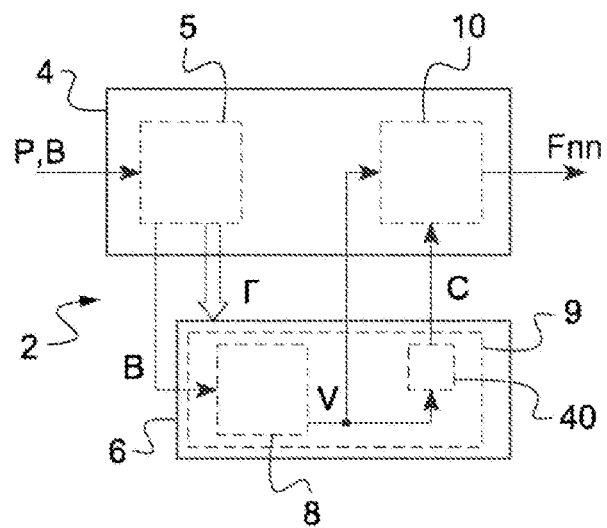
FIG. 3 shows an electronic encoding device used within the framework of the invention.

FIG. 3 shows an electronic encoding device 2 using encoding artificial neural network 8, context determination artificial neural network 40 and entropy encoder 10.

This electronic encoding device 2 comprises a processor 4 (for example, a microprocessor) and a parallel processing unit 6, for example a Graphical Processing Unit or GPU, or a Tensor Processing Unit or TPU.

Processor 4 is programmed (for example by means of computer program instructions executable by processor 4 and stored in a memory—not shown—associated with processor 4) to implement a control module 5 and the already mentioned entropy encoder 10.

As schematically shown in FIG. 3, control module 5 receives data P, B representing an audio or video content to be compressed, here format data P and content data B. These content data B are of same nature as those mentioned hereinabove in the description of FIG. 1 and will not be described again.

Format data P indicate characteristics of the format of representation of the audio or video content, for example for a video content the image sizes (in pixels), the frame rate, the bit depth of the luminance information and the bit depth of the chrominance information.

Parallel processing unit 6 is designed to implement encoding artificial neural network 8 and context determination artificial neural network 40 (both belonging to a data processing assembly such as that of FIG. 1) after having been configured by processor 4 (for example, by control module 5). For that purpose, parallel processing unit 6 is designed to perform in parallel, at a given time, a plurality of operations of the same type.

Hereinafter, the artificial neural network formed of encoding artificial neural network 8 and context determination artificial neural network 40 will be referred to as "overall encoding network" 9. Parallel processing unit 6 is designed to implement this overall encoding network 9 (after having been configured by processor 4 as already indicated).

An example of encoding method implemented by electronic encoding device 2 will now be described with reference to FIG. 4.

The method of FIG. 4 starts with a step E2 of selecting a data processing assembly among a plurality of data processing assemblies in accordance with what has been described hereinabove with reference to FIG. 1.

As already explained, these different data processing assemblies may have the same general structure (as shown in FIG. 1), but the different artificial neural networks 8, 28, 40 are defined by weights (associated with the neurons) varying from a data processing assembly to another (the optimization criteria being different from a data processing assembly to another).

The data processing assembly may for example be selected among data processing assemblies for which decoding artificial neural network 28 and context determination artificial neural network 40 (forming together an overall decoding network as explained hereinafter) are available for an electronic decoding device (such as the electronic decoding device 20 shown in FIG. 6 and described hereinafter). For that purpose, the electronic encoding device can possibly receive beforehand (from the electronic decoding device or a dedicated server) a list of artificial neural networks accessible by this electronic decoding device.

The data processing assembly may also be selected as a function of the intended application (indicated for example by a user through a user interface, not shown, of electronic encoding device 2). For example, if the intended application is videoconference, the selected data processing assembly allows a low-latency decoding. In other applications, the selected data processing assembly could allow a random-access decoding.

In a low-latency video-sequence decoding process, an image of the video sequence is for example represented by encoded data that may be immediately sent and decoded; the data may then be sent in the display order of the video images, which ensures in this case a one-frame latency between encoding and decoding.

In a random-access video-sequence decoding process, the encoded data relating to a plurality of images, respectively, are sent in a different order than the display order of these images, which allows increasing compression. Encoded images without reference to the other images (so-called intra frames) may then be encoded on a regular basis, which allows starting the video sequence decoding from several locations in the encoded stream.

Reference may be made for that purpose to the article "*Overview of the High Efficiency Video Coding (HEVC) Standard*", by G. J. Sullivan, J.-R. Ohm, W.-J. Han and T. Wiegand, in IEEE Transactions on Circuits and Systems for Video Technology, vol. 22, no. 12, pp. 1649-1668, December 2012.

The data processing assembly may also be selected in order to obtain the best possible compression—distortion compromise.

The different criteria for selecting the data processing assembly may possibly be combined together.

Once the data processing assembly selected, control module 5 proceeds, at step E4, to the configuration of parallel processing unit 6 in such a way that parallel processing unit 6 can implement the intended encoding process in this data processing assembly.

This step E4 comprises in particular the instantiation, within parallel processing unit 6, of the overall encoding network 9 comprising encoding artificial neural network 8 and context determination artificial neural network 40 of the selected data processing assembly.

This instantiation may comprise in particular the following steps:
  reserving, within parallel processing unit 6, the memory space required for implementing overall encoding network 9; and/or
  programming parallel processing unit 6 with the weights Γ and activation functions defining overall encoding network 9; and/or
  loading part at least of content data B in a local memory of parallel processing unit 6.

The following steps relate to the encoding (i.e. preparation) of the data stream intended to the electronic decoding device (for example, electronic decoding device 20 described hereinafter with reference to FIG. 6).

The method thus comprises in particular a step E6 of encoding a first header part Fc that comprises data characteristic of the format of representation of the audio or video content (here, for example data linked to the format of the video sequence that is being encoded).

These data forming the first header part Fc indicate for example the image sizes (in pixels), the frame rate, the binary depth of the luminance information and the binary depth of the chrominance information. These data are for example built on the basis of the above-mentioned format data P (after a potential reformatting).

Control module 5 performs at step E8 the encoding of a second header part comprising data R indicative of the overall decoding network comprising decoding artificial neural network 28 and context determination artificial neural network 40 that belong to the data processing assembly selected at step E2.

According to a first possible embodiment, these indicative data R may comprise an identifier of the overall decoding network.

Such an identifier indicates (among a plurality of overall decoding networks, for example among the set of overall decoding networks available for the electronic decoding device) the overall decoding network corresponding to the above-mentioned overall encoding network 9, said overall decoding network having thus to be used for decoding representative values V. (Such an overall decoding network comprising, on the one hand, a decoding artificial neural network corresponding to encoding artificial neural network 8 included in overall encoding network 9, and on the other hand, the context determination artificial neural network 40 included in overall encoding network 9.)

In other words, such an identifier defines by convention (shared in particular by the electronic encoding device and the electronic decoding device) this overall decoding network, for example among all the overall decoding networks available for (or accessible by) the electronic decoding device. As already indicated, electronic encoding device 2 can possibly receive beforehand (from the electronic decoding device or a dedicated server) a list of artificial neural networks accessible by the electronic decoding device.

According to a second possible embodiment, these indicative data R may comprise data descriptive of the overall decoding network.

The overall decoding network (including decoding artificial neural network 28 and context determination artificial neural network 40 that belong to the data processing assembly selected at step E2) is for example encoded (i.e. represented) by these descriptive data (or encoding data of the decoding artificial neural network) in accordance with a standard such as MPEG-7 part 17 or with a format such as JSON.

Reference may be made for that purpose to the article "*DeepCABAC: Context-adaptive binary arithmetic coding for deep neural network compression*", by S. Wiedemann et al., in Proceedings of the 36th International Conference on Machine Learning, Long Beach, California, PMLR 97, 2019, or to the article "*Compact and Computationally Efficient Representation of Deep Neural Networks*", by S. Wiedemann et al., in IEEE Transactions on Neural Networks and Learning Systems (Vol. 31, Iss. 3), March 2020.

It may also be provided that indicative data R comprise an indicator indicating if the overall decoding network belongs to a predetermined set of artificial neural networks (in which case the first possible embodiment mentioned hereinabove is used) or if the overall decoding network is encoded in the data stream, i.e. represented by means of the above-mentioned descriptive data (in which case the second possible embodiment mentioned hereinabove is used).

Figure 4:
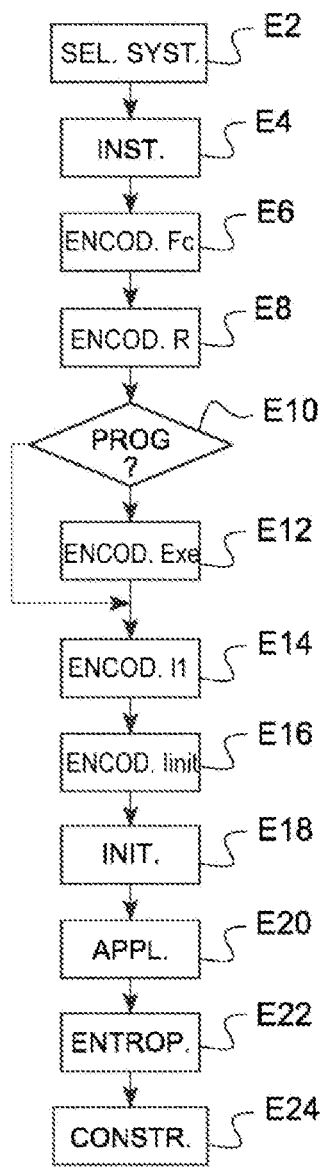
FIG. 4 is a flowchart showing steps of an encoding method implemented within the electronic encoding device of FIG. 3.

The method of FIG. 4 continues with a step E10 of determining the possibility for the electronic decoding device to implement the decoding process using the above-mentioned overall decoding network.

Control module 5 determines for example this possibility by determining (potentially by means of previous exchanges between the electronic encoding device 2 and the electronic decoding device) if the electronic decoding device comprises a module designed to implement this decoding process or a suitable software for implementation of this decoding process by the electronic decoding device when this software is executed by a processor of the electronic decoding device.

If control module 5 determines that it is possible for the electronic decoding device to implement the decoding process, the method continues with step E14 described hereinafter.

If control module 5 determines that it is not possible for the electronic decoding device to implement the decoding process, the method performs step E12 described hereinafter (before going to step E14).

As an alternative, the choice to perform or not step E12 (before performing step E14) could be made depending on another criterion, for example as a function of a dedicated indicator stored within electronic encoding device 2 (and possibly adjustable by the user via a user interface of electronic encoding device 2) or as a function a choice made by the user (obtained for example via a user interface of electronic encoding device 2).

Control module 5 encodes in the data stream, at step E12, a third header part containing a computer program Exe (or code) executable by a processor of the electronic decoding device. (The use of the computer program Exe within the electronic decoding device is described hereinafter with reference to FIG. 7.)

In order to be adapted to an execution within the electronic decoding device, the computer program is for example chosen within a library as a function of information relating to the hardware configuration of the electronic decoding device (information received for example during previous exchanges between the electronic encoding device 2 and the electronic decoding device).

The method of FIG. 4 then continues with steps of encoding data representative of the configuration of the entropy encoder 10 used in the data processing assembly selected at step E2 (and hence entropy decoder 30 of this same assembly).

Therefore, the method of FIG. 4 first comprises a step E14 of encoding a fourth header part comprising a piece of information I1 indicative of the set of contexts used for the entropy encoding. In the example described herein, the piece of information I1 is indicative of the number K of contexts used for the entropy encoding.

The method of FIG. 4 then comprises a step E16 of encoding a fifth header part comprising, for each context used for the entropy encoding, a piece of data Iinit for parameterizing the relevant context.

In the case described here, in which the entropy encoding used is of the CABAC type, the parameterization piece of data Iinit associated with a given context is a piece of data for initializing this context, as described for example in Recommendation ITU-T H.265, part "9.3.2.2 *Initialization process for context variables*".

In other embodiments, the parameterization piece of data associated with a given context may be a piece of data indicative of the probability model used for the relevant context during entropy encoding.

The method of FIG. 4 continues with a step E18 of initializing entropy encoder 10 (by control module 5) by means of the above-mentioned parameterization data relating to the different contexts. This type of initialization is described in the above-mentioned document (Recommendation ITU-T H.265, part "9.3.2.2 *Initialization process for context variables*").

The method of FIG. 4 then comprises a step E20 of implementing the encoding process, i.e., here, a step of applying content data B to the input of overall encoding network 9 (or, in other words, a step of activating overall encoding network 9 with content data B as an input). (Thus, content data B are then applied to the input of encoding artificial neural network 8.)

Step E20 thus makes it possible to produce (here at the output of overall encoding network 9) representative values V and context index C. Precisely, representative values V are produced at the output of encoding artificial neural network 8; these representative values V are applied to the input of context determination artificial neural network 40 in such a way that this context determination artificial neural network 40 produces the context index C as an output.

The method of FIG. 4 then comprises a step E22 of entropy encoding representative values V by entropy encoder 10, entropy encoder 10 being parameterized (possibly through control module 5) in the context defined by the context index C produced at the output of overall encoding network 9 (here, precisely, at the output of context determination artificial neural network 40). In the alternative embodiment in which context determination artificial neural network 40 (and hence overall encoding network 9) produces a plurality of context indices C respectively associated with sets of representative values V, entropy encoding of representative values V by entropy encoder 10 is made by parameterizing entropy encoder 10 in the context defined by the context index C associated with the set containing representative value V being entropy encoded.

Entropy encoder 10 thus produces as an output a sequence Fnn of binary elements representing the audio or video content, in compressed form.

Step E22 may comprise in some cases a sub-step (prior to the entropy encoding as such) of binarizing the representative values V, as described in the above-mentioned article "*Context-based adaptive binary arithmetic coding in the H.264/AVC video compression standard*". The object of this binarization step is to convert a representative value V able to take a great number of values into a sequence of binary elements, each binary element being encoded by entropy encoding (and in this case, a context is associated with the encoding of each binary element).

In particular, when step E20 allows the processing of part only of the audio or video content to be compressed (for example, when step E20 performs the processing of a block, or a component, or an image of a video sequence to be compressed), it is possible to repeat the implementation of steps E20 (to obtain representative values of the successive parts of the content) and E22 (to perform the entropy encoding of these representative values).

Processor 4 can thus construct at step E24 the complete data stream comprising header Fet and sequence Fnn of binary elements.

The complete data stream is constructed in such a way that header Fet and sequence Fnn of binary elements are identifiable individually.

According to a possible embodiment, header Fet contains an indicator of binary element sequence Fnn beginning in the complete data stream. This indicator is for example the location, in bits, of the beginning of sequence Fnn of binary elements from the beginning of the complete data stream. (In other words, the header has in this case a predetermined fixed length.)

Other means for identifying header Fet and sequence Fnn of binary elements can be contemplated as an alternative, as for example a marker (i.e. a combination of bits used to indicate the beginning of sequence Fnn of binary elements and the use of which is forbidden in the rest of the data stream, or at least in header Fet).

The data stream constructed at step E24 may be encapsulated in transmission formats known per se, such as "Packet-Transport System" or "Byte-Stream" formats.

In the case of "Packet-Transport System" format (as proposed for example by the RTP protocol), the data are encoded by identifiable packets and transmitted on a communication network. The network can easily identify the boundaries of the data (images, groups of images and here header Fet and sequence Fnn of binary elements), using packet identification information provided by the network layer.

In "Byte-Stream" format, there is no specifically packets and the construction of step E24 must allow identifying the boundaries of the relevant data (such as boundaries between parts of the stream corresponding to each image, and here between header Fet and sequence Fnn of binary elements) using additional means, such as the use of network abstraction layer (NAL) units, where unique binary combinations (such as 0x00000001) make it possible to identify the boundaries between data).

The complete data stream constructed at step E24 can then be emitted at step E26 towards electronic decoding device 20 described hereinafter (by communication means not shown and/or through at least one communication network), or stored within the electronic encoding device 2 (for later transmission or, as an alternative, later decoding, for example within the electronic encoding device itself, which is in this case designed to further implement the decoding method 20 described hereinafter with reference to FIG. 6).

Figure 5:
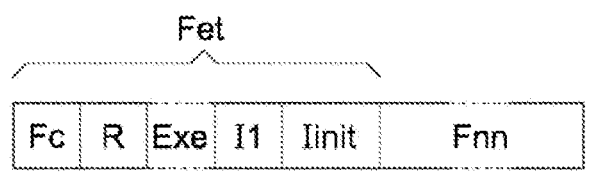
FIG. 5 shows the data stream produced by the electronic encoding device of FIG. 3.

This data stream thus comprises, as shown in FIG. 5, header Fet and sequence Fnn of binary elements.

As is evident from the above, header Fet comprises:
a first part Fc that comprises data characteristics of the audio or video content representation format;
a second part that comprises data R indicative of the overall decoding network (that comprises a decoding artificial neural network and a context determination artificial neural network);
possibly a third part that comprises a computer program Exe executable by a processor of the electronic decoding device;
a fourth part that comprises a piece of information I1 indicative of the set of contexts used for the entropy encoding;
a fifth part that comprises, for each context used for entropy encoding, a piece of data Iinit for parameterizing the relevant context.

According to a conceivable alternative, it could be provided not to transmit the piece of information I1 indicative of the set of contexts used for the entropy encoding, wherein the entropy encoder and the entropy decoder can then use a set of contexts defined in advance (by convention).

Figure 6:
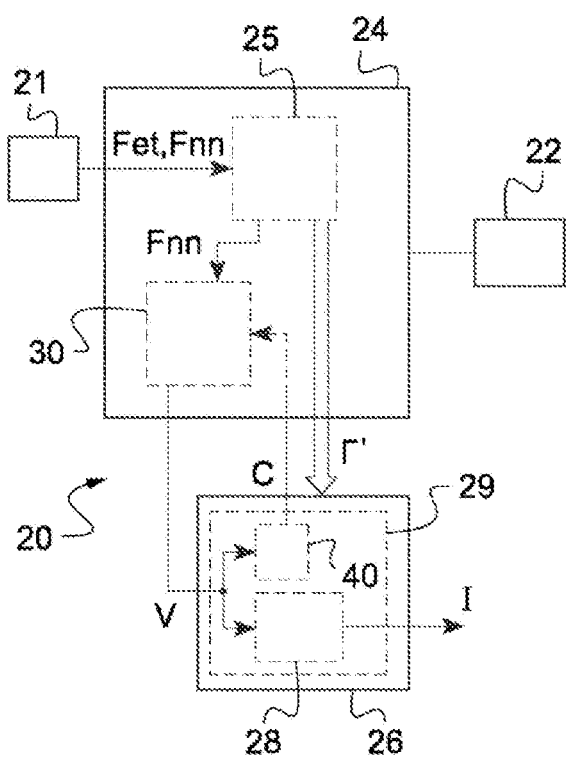
FIG. 6 shows an example of electronic decoding device according to the invention.

FIG. 6 shows an electronic decoding device 20 using entropy decoder 30, context determination artificial neural network 40 and decoding artificial neural network 28 (these elements being described hereinabove with reference to FIG. 1).

This electronic decoding device 20 comprises a receiving unit 21, a processor 24 (for example, a microprocessor) and a parallel processing unit 26, for example a Graphical Processing Unit or GPU, or a Tensor Processing Unit or TPU.

Reception unit 21 is for example a communication circuit (such as a radiofrequency communication circuit) and makes it possible to receive data (and in particular here the data stream described hereinabove) from an external electronic device, such as electronic encoding device 2, and to communicate these data to processor 24 (to which reception unit 21 is for example connected by a bus).

Electronic decoding device 20 also comprises a storage unit 22, for example a memory (possibly a rewritable non-volatile memory) or a hard-drive. Although storage unit 22 is shown in FIG. 5 as a distinct element of processor 24, storage unit 22 could as an alternative be integrated to (i.e. included in) processor 24.

Processor 24 is in this case adapted to execute successively a plurality of instructions of a computer program stored for example in storage unit 22.

Part of these instructions makes it possible, when executed by processor 24, to implement a control module 25 having in particular the functionalities described hereinafter. As an alternative, some of the functionalities of control module 25 could be implemented due to the execution, by processor 24, of instructions identified within header Fet at step E52 as described hereinafter.

Another part of the instructions stored in storage unit 22 makes it possible, when executed by processor 24, to implement the already-mentioned entropy decoder 30. As an alternative, entropy decoder 30 could be implemented due to the execution, by processor 24, of instructions identified within header Fet at step E52 as described hereinafter.

Parallel processing unit 26 is designed to implement context determination artificial neural network 40 and decoding artificial neural network 28 after having been configured by processor 24 (here, precisely, by control module 25). For that purpose, parallel processing unit 26 is designed to perform in parallel, at a given time, a plurality of operations of the same type.

As already indicated, context determination artificial neural network 40 and decoding artificial neural network 28 form together an artificial neural network here called "overall decoding network" and denoted 29 in FIG. 6.

As schematically shown in FIG. 5, processor 24 receives (here via reception unit 21) the data stream comprising header Fet and sequence Fnn of binary elements.

As explained hereinafter, decoding artificial neural network 28 is used within the framework of a processing of data obtained by entropy decoding (by means of entropy decoder 30) of sequence Fnn of binary elements, this data processing aiming to obtain an audio or video content corresponding to the initial audio or video content B.

Storage unit 22 can store a plurality of parameter sets, each parameter set defining an overall decoding network (comprising a context determination artificial neural network and a decoding artificial neural network). As explained hereinafter, processor 24 can in this case configure parallel processing unit 26 by means of a particular set of parameters among these parameter sets in such a way that parallel processing unit 26 can then implement the artificial neural network (i.e., here, the overall decoding network) defined by this particular set of parameters.

Storage unit 22 may in particular store a first set of parameters defining a first artificial neural network forming a random access decoder and/or a second set of parameters defining a second artificial neural network forming a low latency decoder.

In this case, electronic decoding device 20 has decoding options in advance for both situations where random access to the content is desired and situations where the content is to be displayed without delay.

Now will be described with reference to FIG. 7 a decoding method that is implemented within electronic decoding device 20 and using, on the one hand, entropy decoder 30 (parameterized as a function of the context index C produced by context determination artificial neural network 40) and, on the other hand, artificial neural network 28 implemented by parallel processing unit 26.

Figure 7:
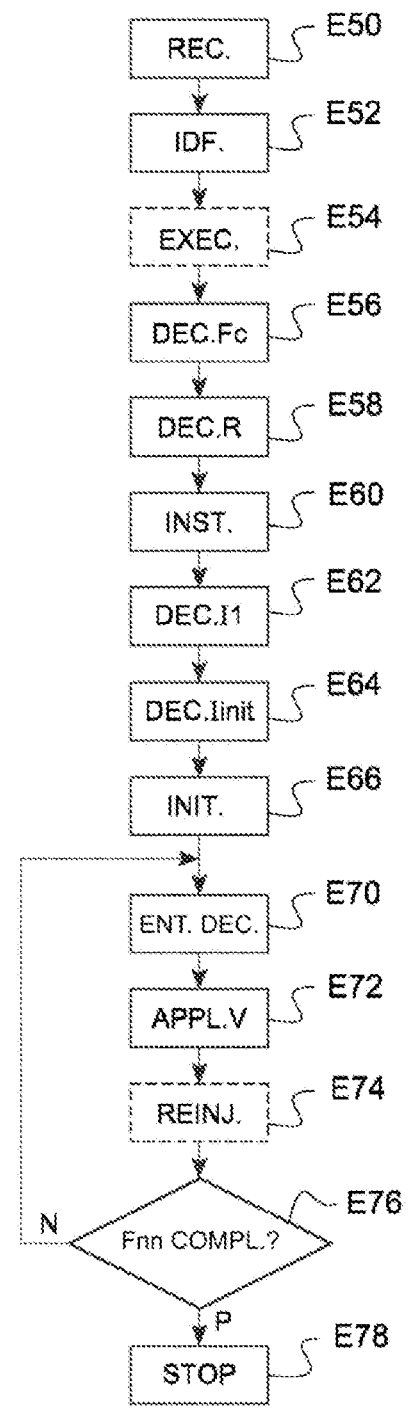
FIG. 7 is a flowchart showing steps of a decoding method implemented within the electronic decoding device of FIG. 6.

The method of FIG. 7 starts with a step E50 of receiving (by electronic decoding device 20, and precisely here by reception unit 21) the data stream comprising header Fet and sequence Fnn of binary elements. Reception unit 21 transmits the received data stream to processor 24 for processing by control module 25.

Control module 25 then proceeds to a step E52 of identifying header Fet and sequence Fnn of binary elements within the received data stream, for example by means of the indicator of binary element sequence beginning (already mentioned in the description of step E24).

Control module 25 can also identify at step E52 the different parts of header Fet (as described hereinabove with reference to FIG. 5).

In the cases where executable instructions (such as the instructions of the computer program Exe) are identified (i.e. detected) within the first data at step E52, control module 25 may launch, at step E54, the execution of these executable instructions in order to implement certain at least of the steps (described hereinafter) of processing of the header data (and possibly of entropy decoding). These instructions may be executed by processor 24 or, as an alternative, by a virtual machine instantiated within electronic decoding device 20.

The method of FIG. 7 continues with a step E56 of decoding data Fc that are characteristic of the format of representation of the audio or video content in such a way as to obtain characteristics of this format. In the case of a video content, for example, the decoding of data part Fc makes it possible to obtain the image sizes (in pixels) and/or the frame rate and/or the binary depth of the luminance information and/or the binary depth of the chrominance information.

Control module 25 then proceeds to a step E58 of decoding data R indicative of the overall decoding network to be used.

According to a first possibility, as already indicated, these data R are an identifier indicating overall decoding network 28, for example within a predetermined set of artificial neural networks.

This predetermined set is for example the set of overall decoding networks accessible by electronic decoding device 20, i.e. the set of overall decoding networks for which electronic decoding device 20 stores a set of parameters defining the relevant artificial neural network (as indicated hereinabove) or may have access to this set of parameters by connection to remote electronic equipment such as a server (as explained hereinafter).

Control module 25 may in this case proceed to the reading, for example in the storage unit 22, of a set of parameters associated with the decoded identifier (this set of parameters defining the overall decoding network identified by the decoded identifier).

As an alternative (or in the case where no set of parameters is stored in storage unit 22 for the overall decoding network identified by the decoded identifier), control module 25 may transmit a request for a set of parameters to a remote server (this request including for example the decoded identifier) and receive as a response the set of parameters defining the artificial neural network (here forming the overall decoding network) identified by the decoded identifier.

The set of parameters (read or received) may comprise in practice certain parameters defining decoding artificial neural network 28, and other parameters defining context determination artificial neural network 40.

According to a second possible embodiment, as already indicated, data R are data Rc describing overall decoding network 29.

As already indicated, these descriptive data (or encoding data) are for example encoded in accordance with a standard such as MPEG-7 part 17 or with a format such as JSON.

The decoding of these descriptive data makes it possible to obtain the parameters defining the overall decoding network 29 to be used, comprising context determination artificial neural network 40 and decoding artificial neural network 28 (to which are applied the data obtained by entropy decoding from sequence Fnn of binary elements, as explained hereinafter).

Such parameters may comprise in practice certain parameters defining decoding artificial neural network 28, and other parameters defining context determination artificial neural network 40.

In some embodiments, the use of the above-mentioned first possibility or second possibility depends on an indicator also included in data R, as already indicated.

Whichever option is used, decoding data R indicative of the overall decoding network to be used makes it possible (here for control module 25) to determine in particular the features of decoding artificial neural network 28. For example, in the example described herein, control module 25 thus determines the number N of feature maps expected at the input of decoding artificial neural network 28 and the sizes H, W of these feature maps. Indeed, the input layer of decoding artificial neural network 28 corresponding to the output layer of encoding artificial neural network 8 as explained hereinabove, each element of a feature map F is associated in a predetermined manner with an input node (or node of the input layer) of the decoding artificial neural network. The number and sizes of the feature maps F are thus linked to the features of decoding artificial neural network 28, as well as certain header data such as the above-mentioned data Fc (comprising in particular the image sizes).

Control module 25 then proceeds, at step E60, to the configuration of parallel processing unit 26 by means of the parameters defining overall decoding network 29 (parameters obtained at step E58), in such a way that parallel processing unit 26 can implement this overall decoding network 29 (comprising context determination artificial neural network 40 and decoding artificial neural network 28).

This configuration step E60 comprises in particular the instantiation of overall decoding network 29 (and hence the instantiation of context determination artificial neural network 40 and decoding artificial neural network 28) within parallel processing unit 26, here using the parameters obtained at step E58.

This instantiation may comprise in particular the following steps:
 reserving, within parallel processing unit 26, the memory space required for implementing overall decoding network 29; and/or
 programming parallel processing unit 26 with the parameters (including for example weights Γ and activation functions) defining overall decoding network 29 (parameters obtained at step E58).

The configuration step E60 may further comprise the application of predefined (initial) values (stored for example in storage unit 22) on the input layer of overall decoding network 29 in such a way that overall decoding network 29 is activated and thus produces as an output (precisely at the output of context determination artificial neural network 40) an initial context index C.

Control module 25 then proceeds, at step E62, to the decoding of information I1 indicative of the set of contexts usable within entropy decoder 30 (here indicative of the number K of contexts usable within entropy decoder 30). As already indicated, for example, K=160.

Control module 25 then proceeds, at step E64, to the decoding of parameterization data Iinit relating to the different contexts, respectively, of the set of contexts used (this set being determined thanks to information I1 decoded at step E62).

Control module 25 may then implement a step E66 of initializing each context usable within the entropy decoder 30 using the relevant context parameterization piece of data Iinit (decoded at step E64).

More precisely, entropy encoder 30 being here adaptive, each context is initialized with the probability model defined by the parameterization data Iinit related to this context.

As an alternative, if entropy decoder 30 uses a fixed probability model for each context, control module 25 configures, at step E66, each context usable by entropy decoder 30 with the probability model defined by the parameterization data Iinit related to this context.

Control module 25 then applies (step E70) to the input of entropy decoder 30 sequence Fnn of binary elements (received via receiving unit 21), while parameterizing entropy decoder 30 in the context identified by the context index C produced at the output of overall decoding network 29 (i.e., here, produced at the output of context determination artificial neural network 40).

During the first iteration (i.e. during the first passage to step E70), the context index C is for example the above-mentioned initial context index C produced as a result of the anticipated activation of overall decoding network 29 during step E60, as explained hereinabove. As an alternative, as long as overall decoding network 29 does not produce a context index C (i.e., here, during the first iteration), entropy decoder 30 may be parameterized in a predefined initial context, possibly stored in storage unit 22 (step E60 including in this case no application of predefined values to overall decoding network 29 for anticipated activation of the latter).

During later iterations (i.e. during later passages to step E70 due to the loop described hereinafter at step E76), entropy decoder 30 is thus parameterized in the context identified by the context index C produced by overall decoding network 29 when representative values V, decoded (by entropy decoding) during the previous passage to step E70, have been applied to the input of overall decoding network 29 (during the previous passage to step E72).

Entropy decoder 30 thus produces at step E70 new representative values V (by entropy decoding of sequence Fnn of binary elements).

It may be provided in practice a mechanism for synchronization between overall decoding network 29 and entropy encoder 30 (in such a way as to guarantee that the context index C to be used is available at the time when entropy decoding of the corresponding representative value V takes place). This synchronization mechanism comprises for example the suspension of entropy decoding (by entropy decoder 30) as long as a new context index C is not available at the output of overall decoding network 29 (i.e. precisely at the output of context determination artificial neural network 40).

According to a first possible embodiment, an intermediate variable C' is stored in memory (for example, in a register of processor 24 or in storage unit 22) and updated by overall decoding network 29 (i.e. precisely by context determination artificial neural network 40). As long as a new context index C is not provided by overall decoding network 29 (i.e. precisely by context determination artificial neural network 40), entropy decoding (by entropy decoder 30) is interrupted. As soon as intermediate variable C' is updated in memory, an entropy decoding of one (or a predetermined number of) representative value(s) V is performed with the context defined by intermediate variable C' (identical to context index C produced by overall decoding network 29), then entropy decoding is suspended again (up to a new updating of intermediate variable C' further to the production of a new context index C at the output of overall decoding network 29, i.e. at the output of context determination artificial neural network 40).

According to a second possible embodiment, the synchronization mechanism consists in making the progress of entropy decoding (by entropy decoder 30) depend on the production of the context index C by overall decoding network 29 (i.e. precisely by the context determination artificial neural network 40). In this second embodiment, a piece of information (for example, the context index C itself or, as an alternative, a dedicated synchronization piece of information) is transmitted from overall decoding network 29 (for example, from context determination artificial neural network 40) to entropy decoder 30, when the part of the neural network (for example, the layer of the neural network) that provides the context index C to be used is activated. When this piece of information is transmitted, a representative value V (or a predetermined number of representative values V) is decoded by entropy decoding (by entropy decoder 30 parameterized in the context defined by the current context index C).

Moreover, in the alternative embodiment already mentioned, in which context determination artificial neural network 40 (and hence overall encoding network 29) produces a plurality of context indices C respectively associated with sets of representative values V, entropy encoding of representative values V by entropy encoder 30 is made by parameterizing, at all times, entropy encoder 30 in the context defined by the context index C associated with the set containing representative value V to be obtained by entropy encoding at that time.

For example, in the example described herein, in which representative values V are organized into a sequence of feature maps F, entropy decoder 30 allows the successive (entropy) decoding of the different feature maps F and control module 25 can hence (at all times) parameterize entropy decoder 30 in the context defined by the context index C associated with the feature map F being entropy decoded.

Processor 24 (here, directly at the output of entropy encoder 30, or as an alternative, through control module 25) can then apply (i.e. present), at step E72, representative values V to the artificial neural network (overall decoding network) 29 implemented by parallel processing unit 26 in such a way that, on the one hand, these data are processed by a decoding process using at least partly decoding artificial neural network 28 and that, on the other hand, a (new) context index C is produced at the output of context determination artificial neural network 40.

In the example described here, decoding artificial neural network 28 receives representative values V as an input and produces as an output a representation I of the encoded content, adapted for a reproduction on an audio or video reproduction device. In other words, representative values V (here in the form of feature maps F) are applied to the input layer of decoding artificial neural network 28 and the output layer of decoding artificial neural network 28 produces the above-mentioned representation I of the encoded content. In the case of a video content (comprising an image or a sequence of images), artificial neural network 28 thus produces as an output (that is to say at the output layer thereof) at least one matrix representation I of an image.

As already mentioned in the description of FIG. 1, the association of an element (i.e. a representative value V) of a feature map F with an input node (or node of the input layer) of decoding artificial neural network 28 is predefined.

In certain embodiments, for processing certain representative values V (corresponding for example to a block or an image), decoding artificial neural network 28 may receive as an input certain at least of the data produced at the output of artificial neural network 28 during the processing of previous data (here prior representative values V), corresponding for example to the preceding block or to the preceding image. In this case, it is proceeded to a step E74 of reinjecting data produced at the output of decoding artificial neural network 28 to the input of decoding artificial neural network 28.

Control module 25 then determines at step E76 if the processing of sequence Fnn of binary elements is completed.

In case of negative determination (N), the method loops at step E70 to perform an entropy decoding of the following part of sequence Fnn of binary elements and to apply other representative values V (produced by this entropy decoding) to decoding artificial neural network 28.

In case of positive determination (P) the method is ended at step E78.

The invention claimed is:

1. A method for decoding a sequence of binary elements, the method comprising:
applying, at an input of an artificial neural network, at least one previously decoded value obtained by an entropy decoder that is distinct from the artificial neural network;
producing a context index at an output of said artificial neural network, as a result of the applying the previously decoded values; and
obtaining at least one new decoded value by applying part of the sequence of binary elements to the entropy decoder parameterized in a context identified by the produced context index,
wherein a process of entropy decoding by the entropy decoder is suspended as long as a new context index is not produced at the output of the artificial neural network.

2. The decoding method according to claim 1, further comprising applying the new decoded value to the input of the artificial neural network to produce, at the output of the artificial neural network, data representative of an audio or video content.

3. The decoding method according to claim 1, wherein the sequence of binary elements is included in a data stream further including a piece of information indicative of a set of contexts usable within the entropy decoder.

4. The decoding method according to claim 3, wherein said piece of information is indicative of a number of contexts usable within the entropy decoder.

5. The decoding method according to claim 1, further comprising initializing each context usable within the entropy decoder using a parameterization piece of data included in a data stream including the sequence of binary elements.

6. The decoding method according to claim 1, wherein the artificial neural network is implemented by a processor, the method further comprising configuring the processor as a function of data included in a data stream including the sequence of binary elements.

7. The decoding method according to claim 1, wherein the artificial neural network is implemented by a parallel processor configured to perform in parallel, at a specific time, a plurality of same operations.

8. The decoding method according to claim 7, wherein the entropy decoder is implemented by another processor that is distinct from the parallel processor.

9. A non-transitory computer-readable medium on which is stored a computer program comprising instructions executable by a processor and configured to implement the decoding method according to claim 1 when the instructions are executed by the processor.

10. An electronic decoding device to decode a sequence of binary elements, the electronic device comprising:
an entropy decoder configured to receive the sequence of binary elements as an input;
an artificial neural network configured to receive at least one previously-decoded value obtained by the entropy decoder as an input and to produce a context index as an output, the entropy decoder being distinct from the artificial neural network; and
control circuitry configured to parameterize the entropy decoder in a context identified by the produced context index to obtain at least one new decoded value at an output of the entropy decoder; and
a synchronization system configured to suspend an entropy decoding process by the entropy decoder as long as a new context index is not produced at the output of the artificial neural network.

11. The electronic decoding device according to claim 10, further comprising a processor configured to implement the artificial neural network.

12. The electronic decoding device according to claim 11, wherein the control circuitry is configured to configure the processor as a function of data included in a data stream including the sequence of binary elements.

13. The electronic decoding device according to claim 11, further comprising another processor that is distinct from the processor, the other processor being configured to implement the entropy decoder.

14. The decoding method according to claim 2, wherein the sequence of binary elements is included in a data stream further including a piece of information indicative of a set of contexts usable within the entropy decoder.

15. The electronic decoding device according to claim 10, further comprising a processor configured to implement the artificial neural network.

16. The decoding method according to claim 1, wherein the artificial neural network comprises a context determination artificial neural network and a decoding artificial neural network.

* * * * *